United States Patent [19]
Martin

[11] Patent Number: 5,307,416
[45] Date of Patent: Apr. 26, 1994

[54] BIAS CIRCUIT FOR CABLE INTERCONNECTS

[75] Inventor: Demian T. Martin, San Jose, Calif.

[73] Assignee: Gerald M. Crosby, Los Altos, Calif.

[21] Appl. No.: 853,125

[22] Filed: Mar. 18, 1992

[51] Int. Cl.⁵ .................................................. H04B 3/00
[52] U.S. Cl. .................................................. 381/77; 375/36
[58] Field of Search .................. 307/264; 381/113, 77; 375/36

[56] References Cited

U.S. PATENT DOCUMENTS

| | | | |
|---|---|---|---|
| 3,763,482 | 10/1973 | Burney et al. | 340/258 R |
| 4,377,759 | 3/1983 | Ohhata et al. | 307/264 |
| 4,414,433 | 11/1983 | Horie et al. | 381/113 |
| 4,538,023 | 8/1985 | Brisson | 174/115 |
| 4,553,247 | 11/1985 | Harris | 375/36 |
| 4,622,638 | 11/1986 | Anderson et al. | 364/431.08 |
| 4,718,100 | 1/1988 | Brisson | 381/77 |
| 4,954,787 | 9/1990 | Brisson | 381/120 |

OTHER PUBLICATIONS

RS-232 by Charles R. Ball, Jr. Nov. 1988.
Lancaster, CMOS Cookbook, 1979, pp. 44-45.
Byerly et al., LM380 Power Audio Amplifier, National Semiconductor, Dec., 1972, pp. AN69-1 to AN69-7.

*Primary Examiner*—Forester W. Isen
*Attorney, Agent, or Firm*—Blakely, Sokoloff, Taylor & Zafman

[57] ABSTRACT

A circuit and method for improving the accuracy of an electrical signal communicated between electrical devices, particularly audio equipment, is disclosed herein. The apparatus includes a circuit that biases a cable to a biased voltage. A signal, analog or digital, is communicated through the biased cable. The present invention has applicability in any cable that is used to send electrical signals between electrical equipment, and particularly equipment for reproducing audio signals, such as high fidelity stereo equipment in order to more closely reproduce the musical qualities of the original recordings.

5 Claims, 3 Drawing Sheets

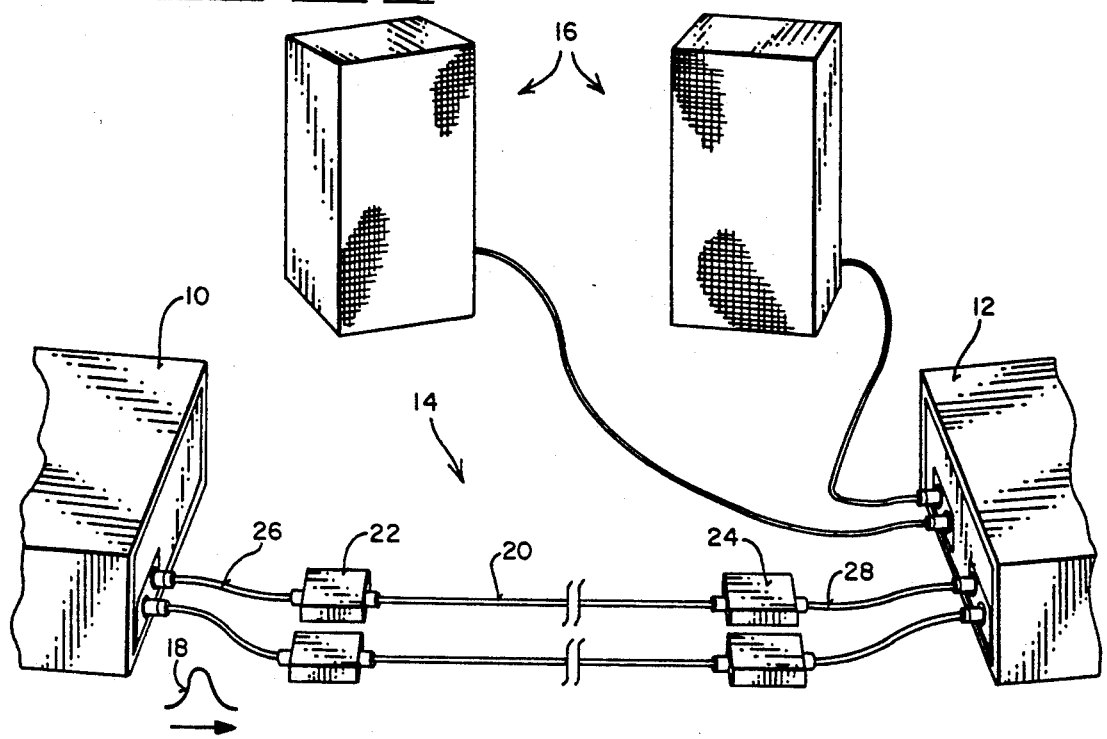
FIG_1
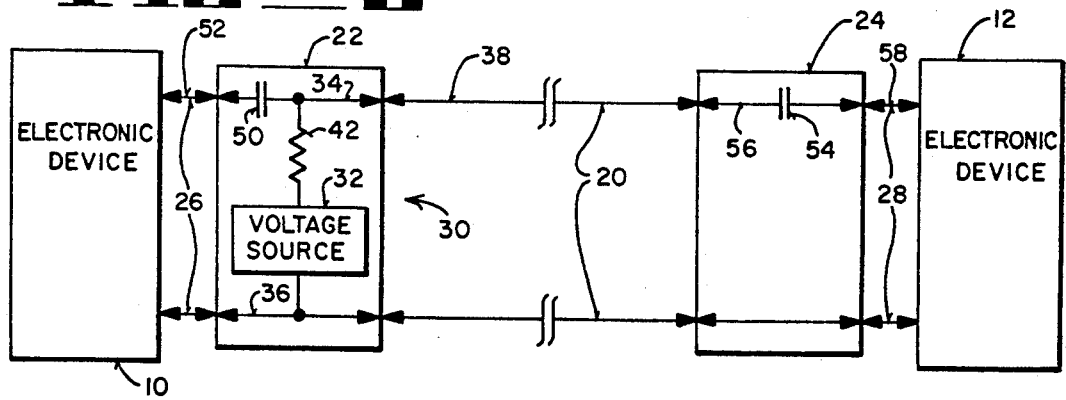
FIG_2
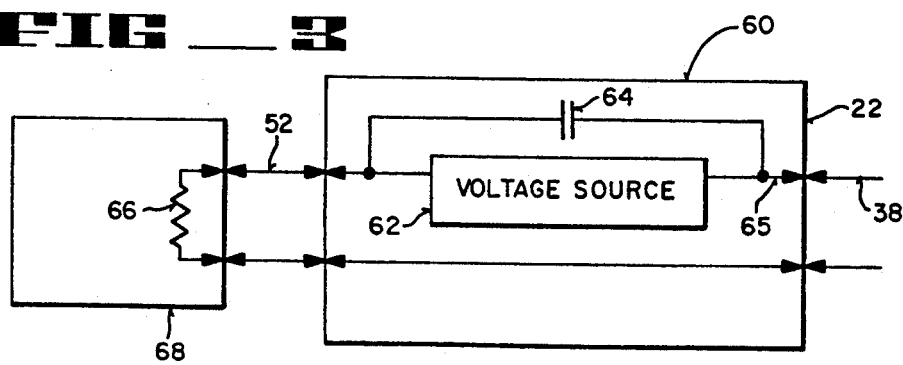
FIG_3

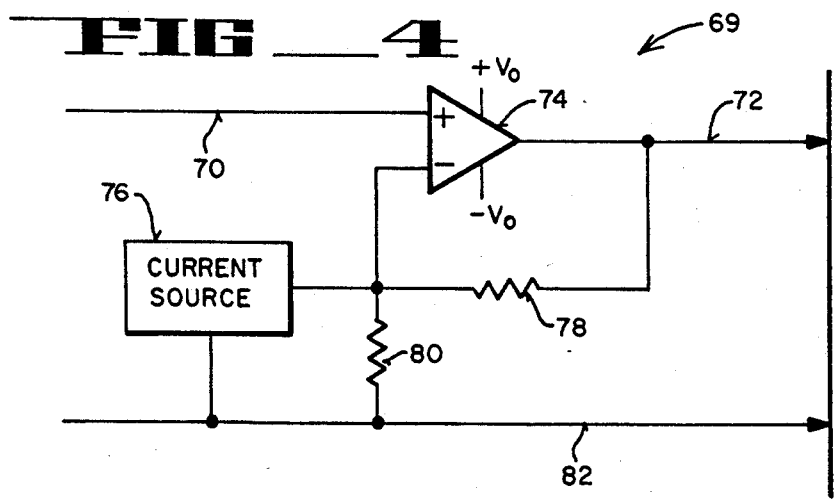
FIG_4
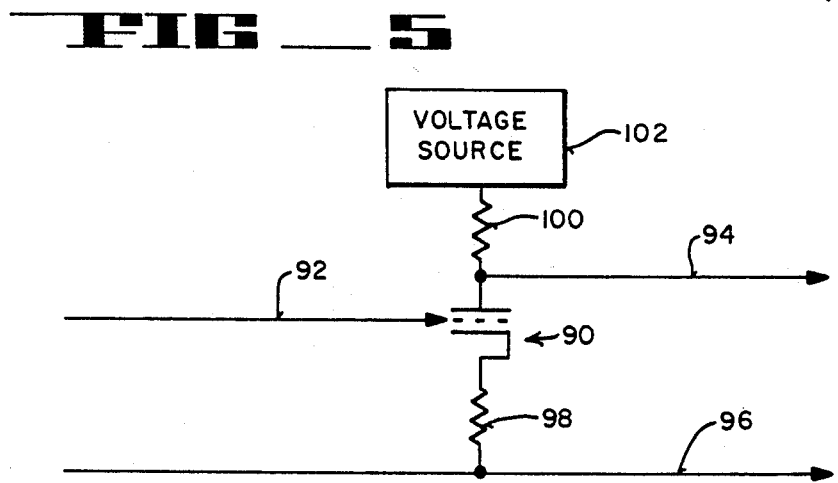
FIG_5
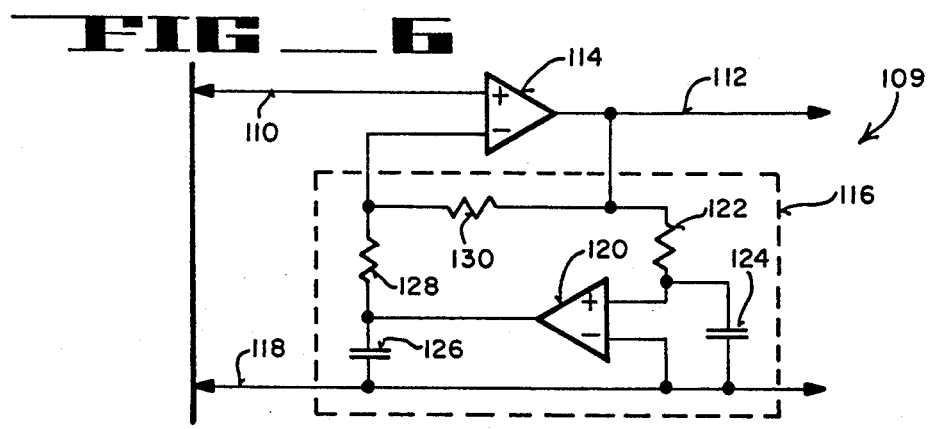
FIG_6
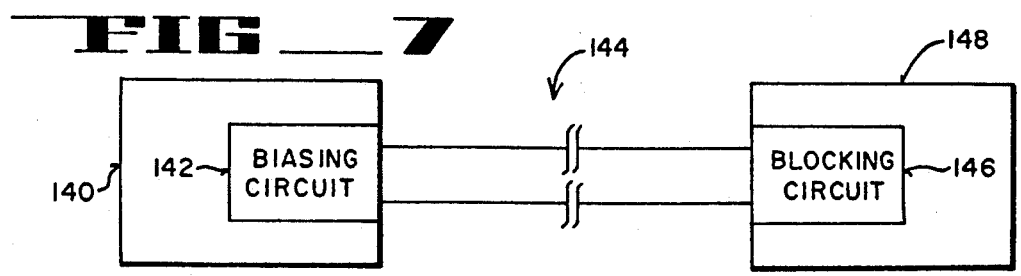
FIG_7

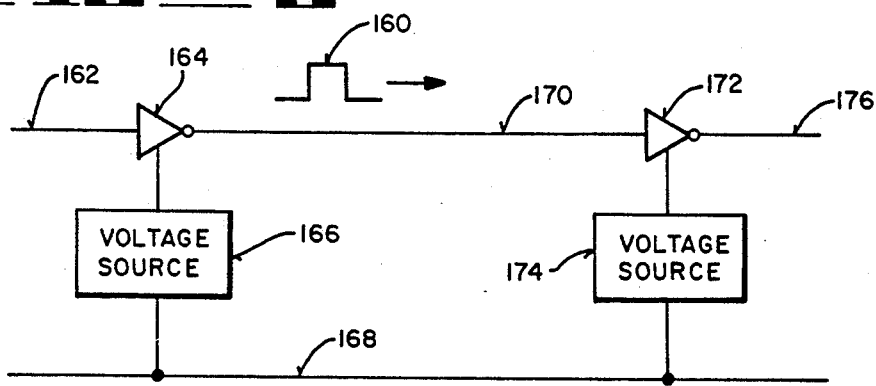
FIG_8
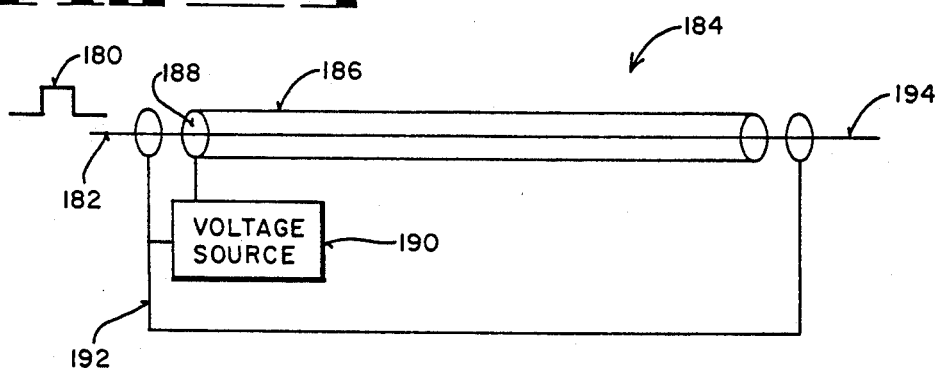
FIG_9
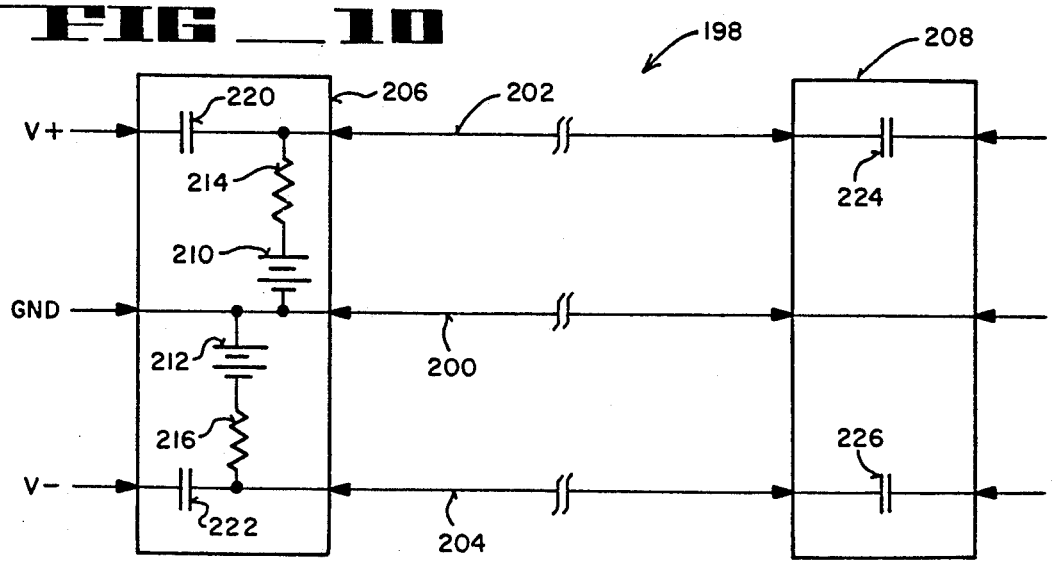
FIG_10

BIAS CIRCUIT FOR CABLE INTERCONNECTS

BACKGROUND OF THE INVENTION

1. Field of the Invention

The present invention relates to connections between electrical equipment. More specifically, the present invention relates to interconnections for audio and video equipment.

2. Description of Related Art

Designers of audio equipment and accessories are constantly striving for technical innovations to create better sound quality. One particular area of interest over the past few years has been the cables, or "interconnects", between discrete components of an audio system. A better interconnect can more accurately communicate the electrical signal between electrical devices, thereby providing better sound quality when the electrical signal is transformed into music at the audio speakers. For example, a top quality interconnect can appreciably improve the communication between a compact disk (CD) player and a preamplifier, thereby improving the sound of the music.

Thus, innovations in cable technology have provided more accurate communication between audio components which results in appreciable improvement in sound quality, particularly for the high-end audio industry and the audiophile who spends many thousands of dollars to purchase the components of a high-end audio system. Top quality cables may cost several hundreds of dollars, all for the purpose of more accurately communicating an electrical signal.

It would be an advantage to provide an apparatus and method to better communicate an electrical signal between electrical equipment. Particularly for the audio industry, it would be an advantage if the system were compatible with existing interconnects and electrical devices. Furthermore, it would be an advantage if the apparatus and method could be efficiently installed during the manufacture of electrical equipment, and if it were cost effective to install in average audio components as well as high-end audio components.

SUMMARY OF THE INVENTION

The present invention provides an apparatus and method for improving the accuracy of an electrical signal communicated between electrical devices. The present invention has applicability in equipment for reproducing audio and video signals, such as high fidelity stereo equipment in order to more closely reproduce the musical qualities of the original recordings. The present invention also has applicability in any cable that is used to send electrical signals, analog or digital, between any type of electrical equipment.

In one embodiment, the present invention provides a circuit for improving accuracy of communication through a cable having a first and a second conductor. The cable is connected between a first and a second electrical device. The circuit includes biasing means for supplying a bias voltage across the first and the second conductor of the cable, first isolation means for isolating the first electrical device from the bias voltage, and second isolation means for isolating the second electrical device from the bias voltage. The supply means may include a voltage source and a resistor connected in series across the first and second conductors of the cable. The first isolation means may comprise a first blocking capacitor connected to the first conductor and positioned between the biasing means and the first electrical device. Likewise, the second isolation means may comprise a second blocking capacitor connected to the first conductor and positioned between the biasing means and the second electrical device.

In alternate embodiments, the first isolation means and the biasing means may comprise a first active circuit configuration that receives an input signal from the first electrical device, biases the cable and isolates the bias voltage from the input to the active circuit configuration. In other embodiments, the second isolation means may comprise a second active circuit configuration that isolates the bias voltage in the cable from the output to the second electrical device.

A method of the present invention provides a method for communicating an electrical signal between a first and a second electrical device through a cable, including the steps of biasing the cable to a bias voltage, supplying an electrical signal from the first electrical device to the biased cable, communicating the electrical signal through the biased cable, and receiving the electrical signal in the second electrical device.

It may be cost effective to incorporate the biasing apparatus into the audio component's box during manufacture or upgrade of an audio component. If incorporated into the output stage, an output circuit for outputting a biased electrical signal from audio equipment to a cable includes an input line coupled with the audio component for supplying the electrical signal from the audio component to the output circuit, bias means coupled to the input line, and an output means for providing the output signal to the cable. The bias means has a circuit configuration for biasing the electrical signal to provide an output signal that is biased with respect to ground. In some embodiments, it may be advantageous if the biasing means include an active circuit coupled between the input line and the output line. Furthermore, in alternate embodiments it may be useful to incorporate the biasing circuit into the input stage instead of the output stage.

The isolation circuit may also be incorporated into the input stage of an audio component, instead of as a discrete component. Thus, the isolation circuit may be positioned within the box of such a discrete component. An input circuit for receiving an electrical signal biased by a bias voltage and removing the bias to provide an unbiased signal to audio equipment includes an input line for receiving the biased electrical signal and an isolation circuit coupled to the input line. The isolation circuit has a configuration for isolating the bias voltage from the electrical signal to provide an output signal that is unbiased with respect to ground. The isolation circuit may include a blocking capacitor. Alternately, the isolation circuit may include an active circuit coupled between the input line and the output line that has a servo network coupled in a feedback configuration to isolate the bias voltage from the electrical signal.

The present invention also provides a biased cable apparatus for communicating a digital electrical signal from an output of a first electrical device to an input of a second electrical device on a coaxial cable having a center conductor and a conductive shield. The digital signal is defined by a single digital line and an approximately constant ground reference voltage. The biased cable apparatus includes means for applying the digital electrical signal from the single digital line to the center electrode, ground reference means for maintaining the output of the first electrical device and the input to the second electrical device at approximately the same ground reference voltage, and bias means for applying an approximately constant bias voltage to the conductive shield of the coaxial cable with respect to the ground reference voltage. The ground reference means may include a ground reference line connected between the output of the first electrical device and the input to the second electrical device. Furthermore, the biased cable apparatus may include a voltage source coupled between the conductive shield and the ground reference line. The supplied bias voltage may be greater than the peak voltage of the digital electrical signal.

BRIEF DESCRIPTION OF THE DRAWINGS

FIG. 1 is a perspective view of the biasing apparatus connected to bias a cable between two audio components.

FIG. 2 is a schematic diagram of the biasing apparatus in a preferred embodiment including only passive components and a voltage source.

FIG. 3 is a schematic diagram of an alternate embodiment of the biasing circuit including only passive components and a voltage source.

FIG. 4 is a schematic diagram of a biasing circuit constructed using an active component.

FIG. 5 is a schematic diagram of an alternative embodiment of a biasing circuit, constructed using a vacuum tube.

FIG. 6 is a schematic diagram of a blocking circuit constructed using an active component.

FIG. 7 is a block diagram illustrating positioning of the biasing circuits with a first electrical device and the blocking circuits within a second electrical device.

FIG. 8 is a schematic diagram of a biasing apparatus for communicating digital signals.

FIG. 9 is a schematic diagram of an embodiment of the biasing apparatus for communicating digital signals using a coaxial cable.

FIG. 10 is a schematic diagram of an embodiment of the biasing apparatus for biasing a balanced cable.

DETAILED DESCRIPTION OF THE INVENTION

The invention is best understood by reference to the figures wherein like parts are designated with like numerals throughout.

FIG. 1 is a perspective view of a high fidelity stereo system utilizing the biasing apparatus of the present invention. Although the preferred embodiment is explained in terms of audio components, it will be apparent to one skilled in the art that the present invention has applicability for communicating signals between any type of electrical equipment.

The stereo system in FIG. 1 includes a first electrical component 10 and a second electrical component 12 connected by interconnects shown generally by the arrow 14. A pair of speakers 16 are illustrated for exemplary purposes. As illustrated, the first electrical component 10 may, for example be a preamplifier, and the second electrical component 12 may be a power amplifier which drives the speakers 16. However, it will be apparent that the interconnects 14 may be applied between other electrical components, such as a CD player and a preamplifier, a tape deck and a preamplifier, a CD player and a receiver, or between any other audio components.

A signal 18 provided by an output of the first electrical component 10 is communicated through the interconnects 14 to the second electrical component 12. The signal 18 is illustrated as an analog signal, however the present invention also has applicability in communicating digital signals. A preferred embodiment for communicating digital signals is illustrated and explained later with reference to FIGS. 8 and 9.

The interconnects 14 include a length of cable 20 connected between a first circuit box 22 and a second circuit box 24. Preferably the cable 20 is of a high quality audio type available from any of a number of manufacturers. The connection between the cable 20 and the circuit boxes 22 and 24 is preferably of the gold plated RCA type. Between the first circuit box 22 and the first electrical circuit 12, a dual conductor connector cable 26 is positioned. The length of the connector cable 26 should be as short as possible. In the preferred embodiment, the length is approximately four to five inches, a length selected to facilitate easy insertion and installation in any audio system. Preferably, the wire in the conductor 26 is of high quality, for example the wire may be formed of "69 copper", which is 99.9999% pure copper conductor. A standard gold plated RCA jack connects the conductor 26 with the first electrical component 10 and the first circuit box 22. Similarly, a connector cable 28 is provided positioned between the second electrical circuit box 24 and the second electrical component 12. Preferably, the length of the conductor cable 28 is as short as possible, however for practical concerns the length of the conductor 28 may be four to five inches, or possibly longer. A standard gold plated RCA plug is provide on either end of the conductor 28 to connect with the second circuit box 24 and the second electrical component 12.

Reference is now made to FIG. 2 which is a schematic diagram of the contents of the circuit boxes 22 and 24. Each box 22 and 24 is preferably manufactured of a metal material to reduce electromagnetic interference. However, the box 22 may also acceptably be manufactured of plastic or other types of material. Within the first circuit box 22, a first circuit shown generally at 30 includes a voltage source 32 positioned to apply a voltage between a first internal conductor 34 and a second internal conductor 36. The internal conductor 34 is connected to a first conductor 38 of the cable 20, and likewise the internal conductor 36 is connected to a second conductor 40 of the cable 20. A resistor 42 is connected in series with the voltage source 32 between the internal conductors 34 and 36. The voltage source 32 is preferably a 15 volt lithium battery with long life expectancy. However any conventional commercial battery, such as a commercial 9 volt battery will also produce acceptable results. The voltage range for the voltage source 32 may be between 0.5 volts and 30.0 volts for audio purposes. Furthermore, in the preferred embodiment, the resistor 42 has a value of 3.6MΩ. The resistor 42 is preferably a high quality metal film resistor, such as that used for high voltage precision measurements. An example of such a resistor is available from Caddock of Los Angeles, Calif. as well as a number of other vendors. The internal wiring of the box 22, as well as the box 24, is preferably of a high quality wire such as the "69 copper" that is 99.9999% pure. For less demanding applications, conventional wire and components would be acceptable.

Within the circuit box 22, a blocking capacitor 50 is positioned in the line between the voltage source 32 and a first conductor 52 of the connector cable 26. A purpose of the blocking capacitor 50 is to prevent the bias voltage inserted by the voltage source 32 from being applied to the electrical device 10. Therefore, the unbiased signal from the electrical device 10, which would generally operate around a zero potential, is isolated from the biasing voltage supplied by the voltage source 32. In the circuit box 24, a blocking capacitor 54 is connected to an internal conductor 56 that is connected between the first conductor 38 of the cable 20 and a first conductor 58 of the connector cable 28. The purpose of the blocking capacitor 54 is similar to that of the blocking capacitor 50: it prevents the bias voltage from affecting the inputs to the second electrical device 12. Preferably, the capacitors 50, 54 are metallized multicapacitors available from Music Interface Technologies (MIT) of Auburn, Calif. Other conventional capacitors may also be suitable for less demanding applications. With the electrical box 24, all connections and internal wiring are similar to that of the first electrical box 22; i.e., in the preferred embodiment the internal wiring may be of high quality copper, and the connections are a standard gold plated RCA connections.

The circuit boxes 22 and 24 have been illustrated in FIG. 1, separate from the first electrical device 10 and the second electrical device 12. However, in other embodiments the contents of the first circuit box 22 may be incorporated within the box of the first electrical device 10, and likewise, the contents of the second circuit box 24 may be incorporated within the box of the second electrical device 12. Thus, the contents of the first circuit box 22 may be coupled as a part of the output stage of the first electrical device 10, and likewise, the contents of the second circuit box 24 may be coupled as a part of the input stage of the second electrical device 12, as discussed in more detail below with reference to FIG. 7.

In alternate embodiments, it should be apparent that the voltage source 32 and resistor 42 may be positioned within the second circuit box 24 to bias the cable 20, instead of being positioned within the first circuit box 22 as illustrated in FIG. 2. Such a circuit would provide substantially similar biasing.

Reference is now made to FIG. 3 which illustrates an alternative embodiment of a circuit within the first electrical box 22. The circuit, illustrated generally at 60 includes a voltage source 62 connected in parallel with a capacitor 64 on an internal conductor 65 connected between the first conductor 38 of the cable 20 and the first conductor 52 of the connection cable 26. The circuit 60 relies upon an internal resistance 66 within an electrical device 68. It should be apparent that unless the electrical device 68 has this internal resistance 66 that circuit 60 will not operate to provide the desired voltage. The implementation of FIG. 3 is similar in its components with respect to the circuit box 22 of FIG. 2. The circuit of FIG. 3 may be advantageous for avoiding the cost of the resistor 42 shown in FIG. 2.

Reference is now made to FIG. 4 which is a schematic diagram illustrating utilization of an active circuit shown generally at 69 to provide a biasing voltage and a blocking (isolation from the bias voltage) effect with regard to an input line 70 and an output line 72 from an op amp 74. The op amp 74 may be any conventional operational amplifier. The op amp is operated with voltages of $+V_o$ and $-V_o$. The noninverting input of the op amp 74 is connected to the input 70. The inverting input of the op amp 74 is connected to a current source 76. The inverting input is also connected through a feedback resistor 78 to the output line 72, and through another resistor 80 to a ground line 82. In operation, the active circuit configuration of FIG. 4 is useful to both bias and isolate the input line 70. Thus, an audio signal can be provided on the line 70, around a reference of ground, and in the output 72, the signal is biased by the amount of the current source 76. The current source 76 may comprise a conventional battery, or it may comprise in an alternate embodiment, a connection to the voltage $V_o$ and a resistor network that defines a biasing voltage.

Reference is now made to FIG. 5, which illustrates an embodiment using a vacuum tube illustrated generally at 90. An input 92 is provided into the vacuum tube 90, which provides an output on the line 94 with respect to a ground line 96. A resistor 98 is coupled between the vacuum tube and ground, and another resistor 100 is coupled between a voltage source 102 and the output line 94. The circuit shown in FIG. 5 operates as both a biasing and isolation of a line 94 with respect to the input line 92. In operation, the vacuum tube biasing of FIG. 5 typically requires a voltage source of up to several hundred volts, and therefore may not be practical for some consumer electronics.

Reference is now made to FIG. 6, which utilizes an active circuit 109 in a configuration to isolate a biased input on the line 110 and provide an unbiased output on the line 112. An input operational amplifier 114 is positioned with its noninverting input connected to the input line 110. The noninverting input to the op amp 114 is connected in a feedback relationship to a servo network 116 represented within the dotted box. The servo network 116 is selected with components to match the biasing voltage on the input line 110 with respect to the ground line 118. In the configuration shown, an op amp 120 is positioned with a resistor 122 coupled between the output line 112 and its noninverting input, and also a capacitor 124 is coupled between its noninverting input and the ground line 118. The inverting input of the op amp 120 is connected directly to the ground line 118. At the output of the op amp 120, a capacitor 126 is connected between ground and the output, and a resistor 128 is positioned between the output of the op amp 120 and the inverting input of the op amp 114. Furthermore, a resistor 130 is positioned between the output of the op amp 114 and its inverting input.

Reference is now made to FIG. 7, which illustrates a first electrical device 140 which includes a biasing circuit 142 as an output coupling. An example of such a component is a pre-amplifier. A pair of interconnect cables 144 are positioned between the biasing circuit 142 and a blocking circuit 146 in an input coupling to a second electrical device 148. An example of such a component is an amplifier. In operation, the biasing circuit 142 is positioned within the box of the first electrical device 140, and it places a bias upon the cables 144 which is isolated from the second electrical device blocked by the blocking circuit 146. The active circuit configurations of FIGS. 4 and 6 are particularly appropriate when incorporated into the input and output couplings as illustrated in FIG. 7. Specifically, the active circuit 69 shown in FIG. 4 could be easily implemented as the biasing circuit 142, in the manufacturing process. Such a configuration may be more cost effective in some applications than the configurations shown in FIGS. 1 and 2.

Furthermore, the blocking circuit 146 may comprise the active circuit 109 from FIG. 6. As with the biasing circuit 142, in some circumstances it may be more cost effective to include the circuit 109 of FIG. 6 or an equivalent within the particular box provided for the second electrical device 148. Alternately, the blocking circuit 146 may comprise a capacitor, such as the blocking capacitor 54 illustrated in FIG. 2.

Reference is now made to FIG. 8 which is a schematic diagram of an embodiment of a biasing network for communicating a digital signal 160. A digital input is provided on the line 162 to a gate 164. A voltage source 166 biases the output of the voltage gate 164 to the desired voltage with respect to a ground line 168. The biased digital signal is supplied on a line 170 to a second digital gate 172 which has its input biased by a voltage source 174. The unbiased digital output is then provided on the line 176 exiting from the second digital gate 172.

Reference is now made to FIG. 9 which is another embodiment for biasing a cable that is useful for communicating digital signals, although it can also be used for analog signals. A digital signal 180 is input on the center conductor 182 of a coaxial cable illustrated generally at 184. The digital signal 180 has a voltage that changes with respect to an approximately constant ground reference voltage. In addition to the center conductor 182, the coaxial cable 184 includes an outer conductor 186 and a dielectric 188. A voltage source 190 is coupled between the outer conductor 186 and the ground reference line 192 for the digital signal 180. At the output end 194 of the center conductor 182, the digital signal is output unbiased with respect to the ground reference 192. In operation, the signal 180 passing through the coaxial cable 184 is biased with respect to the voltage source 190. The voltage of the voltage source 190 need not be the same as that of the digital signal 180. For example, if the digital signal 180 goes from 0 to 5 volts, the voltage source 190 may be maintained at 15 volts, for example. In implementation, it should be noted that the ground reference 192 connects the input signal with the signal output at the end 194, and therefore provides a common ground reference.

Reference is now made to FIG. 10 which illustrates an embodiment useful for balanced interconnects. Specifically, a balanced interconnect 198 includes a ground reference line 200, a V+line 202 and a V−line 204. A biasing and blocking circuit is provided within the box 206, and a blocking circuit is provided within the box 208. Within the box 206, a biasing voltage is supplied by a battery 210 or other voltage source between ground and V+, and an additional, second biasing voltage is provided by a second battery 212 or other voltage source connected between ground and V−line 204. A resistor 214 is coupled in series with the battery 210, and a second resistor 216 is coupled in series with the battery 212. In order to block the biased voltage from the inputs, a blocking capacitor 220 is coupled between the biasing voltage of the battery 210 and the input on the V+line, and a second blocking capacitor 222 is positioned between the battery 212 and the input on the V−line. Construction of the box 206, and the components therein in the preferred embodiment are identical to those described with respect to the box 20 in FIGS. 1 and 2.

Within the box 208, a blocking capacitor 224 is coupled to the V+line, and a second blocking capacitor 226 is coupled to the V−line. Construction of the box 208 and its components in the preferred embodiment are identical with those described with reference to the box 24 discussed with reference to FIGS. 1 and 2. In operation, the circuit of FIG. 10 provides a biased balanced cable, specifically a biased voltage is provided between the V+cable 202 and the ground 206, and a second biasing voltage is provided between the V−line 204 and ground 200.

Two explanations will be advanced that may explain the increased signal accuracy provided by the present invention: an electrostatic effect at the electron level, and a mechanical bias applied by the electrostatic bias. It should be remembered that these explanations may or may not be entirely accurate, and that other explanations may be advanced to explain the advantages provided by the present invention.

The first explanation is based on the electrostatic effect, which occurs when a voltage is applied across an insulating medium. The electrons in the medium are attracted to the negative polarity conductor. Accordingly, the dipoles in the insulator become aligned with the electric field defined by the conductors. However, when an alternating field is applied across the insulating medium, the potentials reverse each time the signal passed through zero. As a result, the electrons are pulled alternately from one side of the interface to the other. This process operates at a nonlinear quantum level instead of as a linear system. The nonlinearities encountered in passing through zero can cause signal distortion in the unbiased system. The effect of the nonlinearities becomes important in light of the ±90 dB (and greater) range for audio signal power. By pre-biasing the voltage on the cable, the signal is prevented from passing through zero voltage. The result is to eliminate the nonlinearities in the cable near the zero voltage region.

A second explanation is based upon the mechanical force exerted by the electrostatic bias. A bias voltage applied across an insulator causes the cable's conductors to be attracted to each other, creating a mechanical stress across the insulator. However, for an unbiased alternating voltage (e.g. audio) signal with a large spectral content, the stress will be reversed at least every cycle as the zero voltage is crossed. The mechanical structure of a conventional cable has the ability to first store the compression in the insulator between the conductors, and then return the energy delayed in a nonlinear manner as a function of its mechanical properties. By pre-biasing the voltage, the mechanical system is pre-tensioned, therefore reducing the range of variations in the stress and improving the linearity of the system.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. A circuit apparatus for improved accuracy of communication of a voltage varying digital signal through a cable connectable between a first electrical device having a output connection and a second electrical device having an input connection, the cable having a first and a second conductor, said digital signal being supplied from the first electrical device to the second electrical device, comprising:
- first isolation means for isolating the output of the first electrical device from the bias voltage, said first isolation means including a first digital gate having an input coupled to receive the digital signal from the first electrical device;
- biasing means for supplying a bias voltage across the first and the second conductor of the cable, said biasing means including means for biasing the output of the first digital gate to the bias voltage so that a biased output of the first gate is provided, said bias voltage being preselected so that it biases the biased digital signal above ground so that the low voltage of the biased digital signal will be at least one-half of the peak-to-peak voltage swing of the biased digital signal;
- second isolation means for isolating the input of the second electrical device from the bias voltage, said second isolation means including a second digital gate having an input connected to the biased output of the first digital gate;
- means for biasing the input of the second digital gate to said bias voltage; and
- an output line from said second digital gate for outputting an unbiased digital signal.

2. A biased cable apparatus for communicating a voltage varying electrical signal from an output of a first electrical device to an input of a second electrical device on a coaxial cable having a center conductor and a conductive shield, said electrical signal being provided by a single line and an approximately constant ground reference voltage, the apparatus comprising:
- means for applying the electrical signal from the single line to the center electrode;
- ground reference means for maintaining the output of the first electrical device and the input to the second electrical device at approximately the same ground reference voltage; and
- bias means for applying an approximately constant bias voltage to the conductive shield of the coaxial cable with respect to the ground reference voltage said bias voltage being larger than any peak-to-peak voltage of the voltage varying electrical signal.

3. The biased cable apparatus of claim 2 wherein the ground reference means includes a ground reference line connected between the output of the first electrical device and the input to the second electrical device.

4. The biased cable apparatus of claim 3 wherein the bias means includes a voltage source coupled between the conductive shield and the ground reference line.

5. The biased cable apparatus of claim 3 wherein the bias means includes means for supplying a bias voltage that is greater than the peak voltage of the electrical signal.

* * * * *